US008016095B2

(12) United States Patent
Daniels et al.

(10) Patent No.: US 8,016,095 B2
(45) Date of Patent: Sep. 13, 2011

(54) DEVICE FOR OFFLOADING CAPPED VIALS USEFUL IN SYSTEM AND METHOD FOR METHOD FOR DISPENSING PRESCRIPTIONS

(75) Inventors: Matthew P. Daniels, Pittsboro, NC (US); Christopher Todd Hilliard, Bath, NC (US); George Raymond Abrams, Jr., Cary, NC (US)

(73) Assignee: Parata Systems, L.L.C., Durham, NC (US)

( * ) Notice: Subject to any disclaimer, the term of this patent is extended or adjusted under 35 U.S.C. 154(b) by 446 days.

(21) Appl. No.: 11/755,249

(22) Filed: May 30, 2007

(65) Prior Publication Data

US 2008/0283544 A1 Nov. 20, 2008

Related U.S. Application Data

(60) Provisional application No. 60/938,878, filed on May 18, 2007.

(51) Int. Cl.
*B65G 47/74* (2006.01)
*B65G 11/00* (2006.01)

(52) U.S. Cl. ................................ 193/4; 193/2 R; 221/13

(58) Field of Classification Search ......... 193/4; 221/13
See application file for complete search history.

(56) References Cited

U.S. PATENT DOCUMENTS

| | | | | |
|---|---|---|---|---|
| 5,353,939 | A * | 10/1994 | Beeler et al. | 211/59.3 |
| 2004/0026442 | A1 | 2/2004 | Hutchinson | |
| 2005/0263537 | A1 | 12/2005 | Gerold et al. | |

FOREIGN PATENT DOCUMENTS

EP 0 656 200 A2 6/1995

OTHER PUBLICATIONS

International Search Report and the Written Opinion of PCT/US2008/005146 dated Jul. 21, 2008.

* cited by examiner

*Primary Examiner* — Kavel Singh
(74) *Attorney, Agent, or Firm* — Myers Bigel Sibley & Sajovec

(57) ABSTRACT

An offloading unit for an automated pharmaceutical machine that dispenses filled, capped pharmaceutical vials includes: at least one chute including a receiving section and a pick-up section. The receiving section and the pick-up section are divided by an inlet. The receiving section has a concave sloping ramp and side walls. The pick-up section has a trough with a floor that slopes relative to a horizontal surface and a front wall at one end of the trough. The inlet is defined by a rear wall and the upper edge of the trough. The chute also includes dividers mounted to and rising above the trough and attached to the rear wall. The inlet and dividers are configured and positioned such that an object as defined in UL 61010A-1, 1740 cannot pass through the inlet from the trough.

11 Claims, 10 Drawing Sheets

DEVICE FOR OFFLOADING CAPPED VIALS USEFUL IN SYSTEM AND METHOD FOR METHOD FOR DISPENSING PRESCRIPTIONS

RELATED APPLICATION

The present application claims priority from U.S. Provisional Patent Application Ser. No. 60/938,878, filed May 18, 2007 and entitled DEVICE FOR OFFLOADING CAPPED VIALS USEFUL IN SYSTEM AND METHOD FOR DISPENSING PRESCRIPTIONS, the disclosure of which is hereby incorporated herein in its entirety.

FIELD OF THE INVENTION

The present invention is directed generally to the dispensing of prescriptions of pharmaceuticals, and more specifically is directed to the automated dispensing of pharmaceuticals.

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. Different exemplary approaches are shown in U.S. Pat. No. 5,337,919 to Spaulding et al. and U.S. Pat. Nos. 6,006,946; 6,036,812 and 6,176,392 to Williams et al. The Williams system conveys a bin with tablets to a counter and a vial to the counter. The counter dispenses tablets to the vial. Once the tablets have been dispensed, the system returns the bin to its original location and conveys the vial to an output device. Tablets may be counted and dispensed with any number of counting devices. Drawbacks to these systems typically include the relatively low speed at which prescriptions are filled and the absence in these systems of securing a closure (i.e. a lid) on the container after it is filled.

One additional automated system for dispensing pharmaceuticals is described in some detail in U.S. Pat. No. 6,971, 541 to Williams et al. This system has the capacity to select an appropriate vial, label the vial, fill the vial with a desired quantity of a selected pharmaceutical tablet, apply a cap to the filled vial, and convey the labeled, filled, capped vial to an offloading station for retrieval.

Although this particular system can provide automated pharmaceutical dispensing, certain of the operations may be improved. For example, the offload station of the system comprises a series of stationary holding compartments of conventional configuration. It may be desirable to provide an offload station having a different configuration that can improve speed and reliability of the system.

SUMMARY OF THE INVENTION

As a first aspect, embodiments of the present invention are directed to an offloading unit for an automated pharmaceutical machine that dispenses filled, capped pharmaceutical vials. The offloading unit comprises: at least one chute including a receiving section and a pick-up section. The receiving section and the pick-up section are divided by an inlet. The receiving section has a concave sloping ramp and side walls. The pick-up section has a trough with a floor that slopes relative to a horizontal surface and a front wall at one end of the trough. The inlet is defined by a rear wall and the upper edge of the trough. The chute also includes dividers mounted to and rising above the trough and attached to the rear wall. The inlet and dividers are configured and positioned such that an object as defined in UL 61010A-1, 1740 cannot pass through the inlet from the trough.

As a second aspect, embodiments of the present invention are directed to an offloading unit for an automated pharmacy machine that dispenses filled, capped pharmaceutical vials that comprises at least one chute, the chute including a receiving section and a pick-up section, the receiving section and the pick-up section divided by an inlet, the receiving section having a concave sloping ramp and side walls, the pick-up section having a trough with a floor that slopes relative to a horizontal surface and a front wall at one end of the trough, the inlet being defined by a rear wall and the upper edge of the trough. The inlet is generally circular and has a largest dimension of no more than 2.85 inches. A distance between the sloping ramp and the rear wall is between about 2.5 and 2.75 inches, and a distance between the side walls of the receiving section is between about 2.5 and 2.75 inches.

As a third aspect, embodiments of the present invention are directed to an offloading unit for an automated pharmacy machine that dispenses filled, capped pharmaceutical vials comprising at least one chute, the chute including a receiving section and a pick-up section, the receiving section and the pick-up section divided by an inlet, the receiving section having a concave sloping ramp and side walls, the pick-up section having a trough with a floor that slopes relative to a horizontal surface and a front wall at one end of the trough, the inlet being defined by a rear wall and the upper edge of the trough. A distance between the front wall and the upper edge of the trough is between about 9 and 10 inches.

As a fourth aspect, embodiments of the present invention are directed to an offloading unit for an automated pharmacy machine that dispenses filled, capped pharmaceutical vials that comprises at least one chute, the chute including a receiving section and a pick-up section, the receiving section and the pick-up section divided by an inlet, the receiving section having a concave sloping ramp and side walls, the pick-up section having a trough with a floor that slopes relative to a horizontal surface and a front wall at one end of the trough, the inlet being defined by a rear wall and the upper edge of the trough. The rear wall includes a bottom portion that angles rearwardly from an upper portion thereof.

DETAILED DESCRIPTION OF EMBODIMENTS OF THE INVENTION

Figure 1:
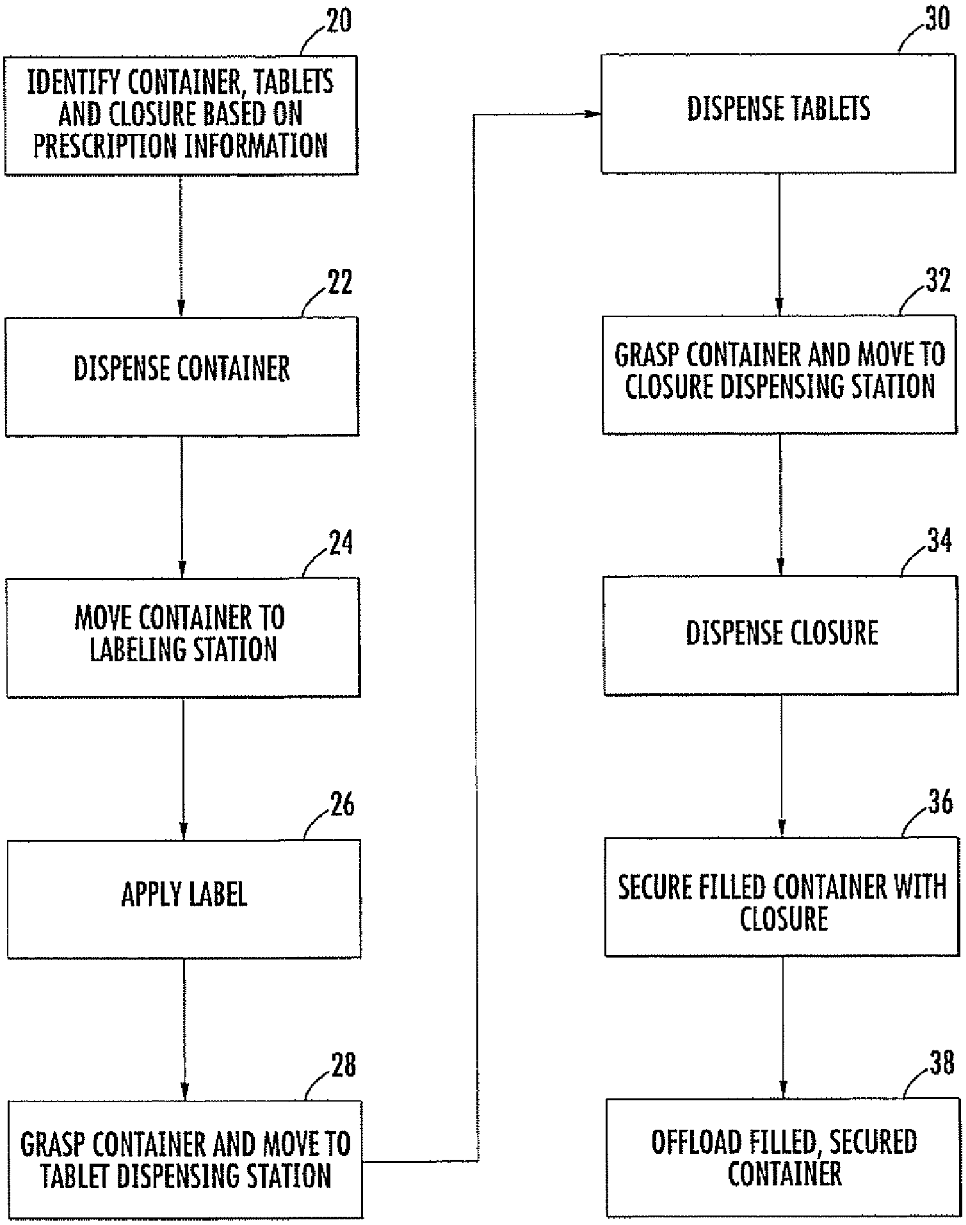
FIG. 1 is a flow chart of operations according to embodiments of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As described above, the invention relates generally to a system and process for dispensing pharmaceuticals. An exemplary process is described generally with reference to FIG. 1. The process begins with the identification of the proper container, tablets or capsules and closure to be dispensed based on a patients prescription information (Box 20). A container of the proper size is dispensed at a container dispensing station (Box 22), then grasped and moved to a labeling station (Box 24). The labeling station applies a label to the container (Box 26), after which the container is transferred to a tablet dispensing station (Box 28), from which the designated tablets are dispensed in the designated amount into the container (Box 30). The filled container is then moved to a closure dispensing station (Box 32), where a closure of the proper size has been dispensed (Box 34). The filled container is secured with a closure (Box 36), then transported to an offload station and offloaded Box 38).

Figure 2:
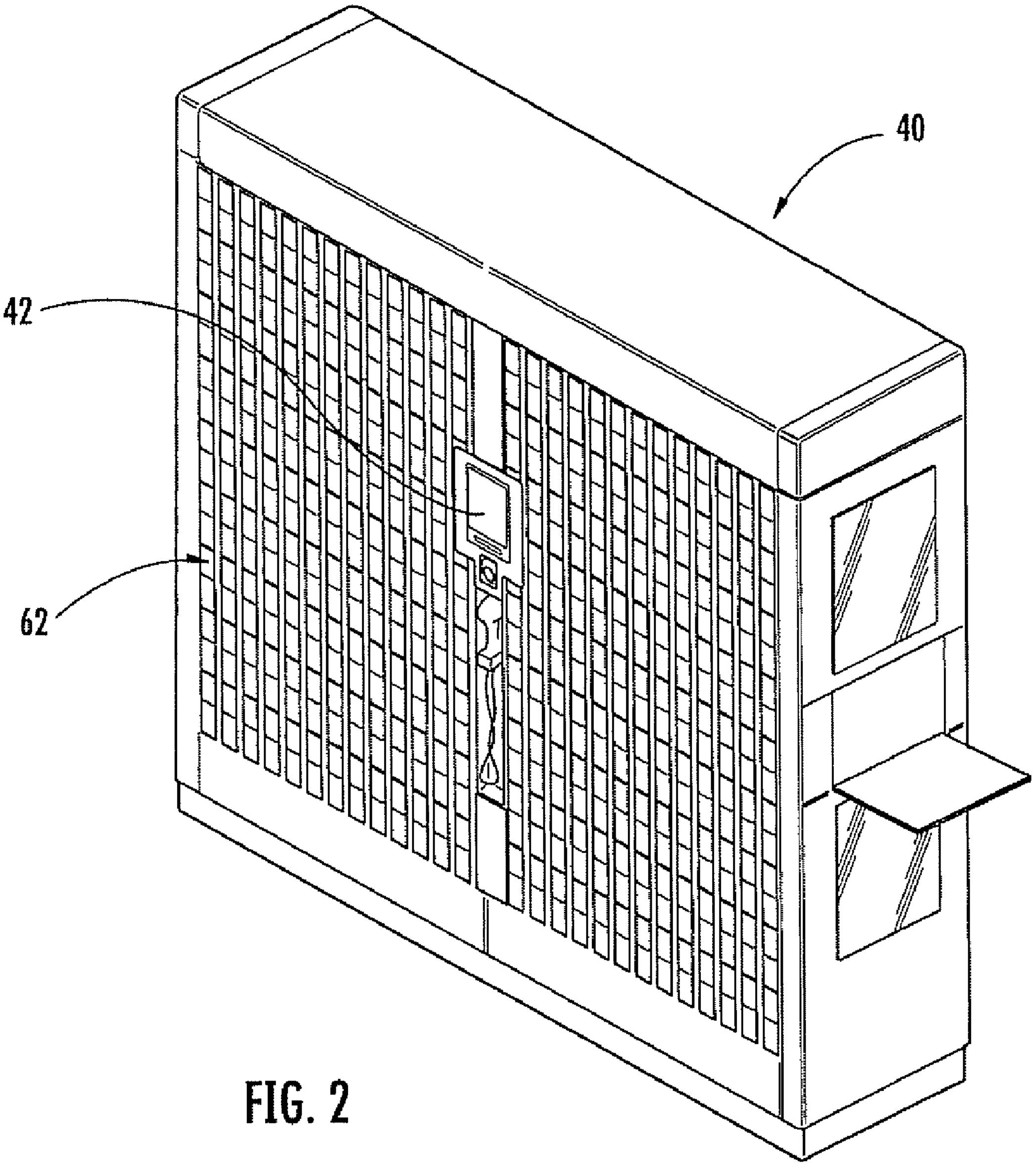
FIG. 2 is a top, front perspective view of a pharmaceutical dispensing system according to embodiments of the present invention.
Figure 3:
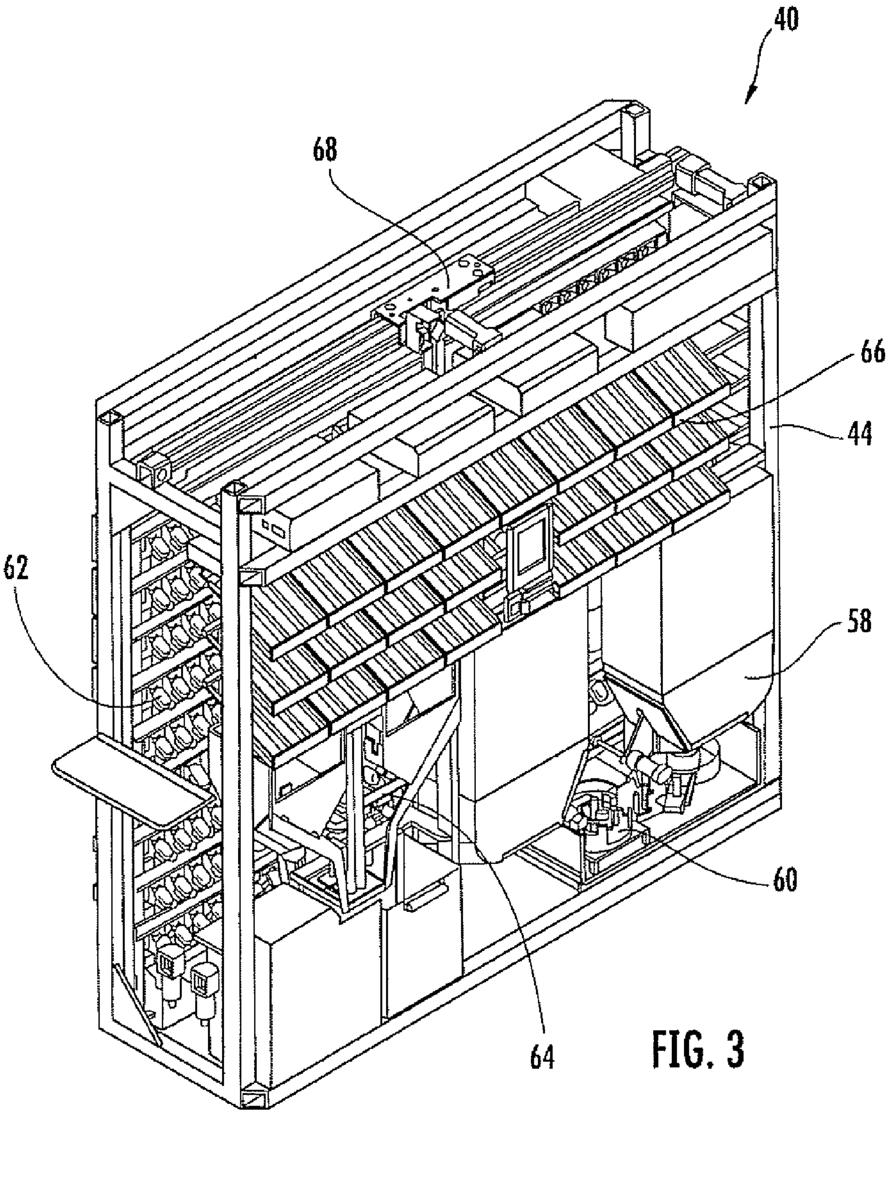
FIG. 3 is a top, rear perspective view of the system of FIG. 2 with the outer panel of the system removed to show the internal components.

A system that can carry out this process is illustrated in FIGS. 2 and 3 and designated broadly therein at 40. The system 40 includes a support frame 44 for the mounting of its various components. The system 40 generally includes as operative stations a controller (represented herein by a graphics user interface monitor 42), a container dispensing station 58, a labeling station 60, a tablet dispensing station 62, a closure station 64, and an offloading station 66. In the illustrated embodiment, containers, tablets and closures are moved between these stations with a single carrier 68; however, in some embodiments only a single carrier may be employed, or one or more additional carriers may be employed. The operation of the container dispensing station 58, the labeling station 60, the tablet dispensing station 62, and the closure station 64 are described in, for example, U.S. patent application Ser. Nos. 11/599,526; 11/599,576; 11/679,850; and 11/111,270, the disclosures of each of which are hereby incorporated herein in its entirety.

Turning now to FIG. 3, the offload station 66 includes a number of chute units 100, each of which, in the illustrated embodiment, includes two chutes 102, 104, although those skilled in this art will appreciate that a chute unit may include only a single chute or may include more than two chutes. Also, the offload station 66 may include only a single chute unit or any appropriate number of chute units.

Figure 4:
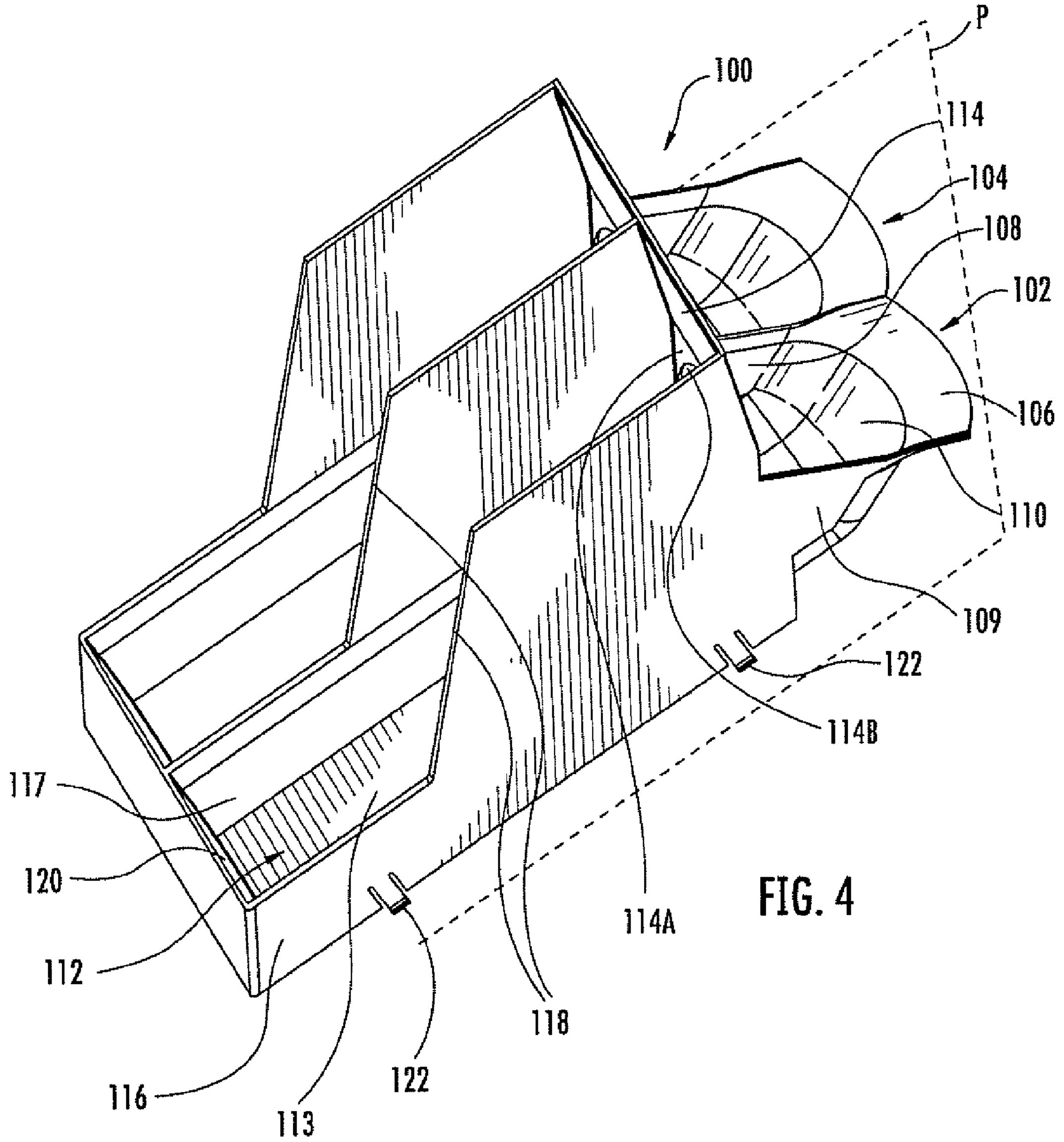
FIG. 4 is an isometric view of an offload chute unit according to the present invention.

The chutes 102, 104 are substantially identical mirror images of each other about a vertical plane P (see FIG. 4). As such, only the chute 102 will be described in detail herein, with the understanding that the description is equally applicable to the chute 104. For the purpose of this discussion, the terms "front," "forward" and derivatives thereof refer to the direction that a pharmaceutical vial travels in the chute 102, i.e., from right to left from the vantage point of FIG. 4. The terms "rear", "back" and derivatives thereof refer to the direction that is opposite of the "forward" direction, i.e., from left to right from the vantage point of FIG. 4. One may also think of the forward direction as extending "downstream" in the chutes 102, 104 and the rearward direction as extending "upstream" in the chutes 102, 104.

Figure 5:
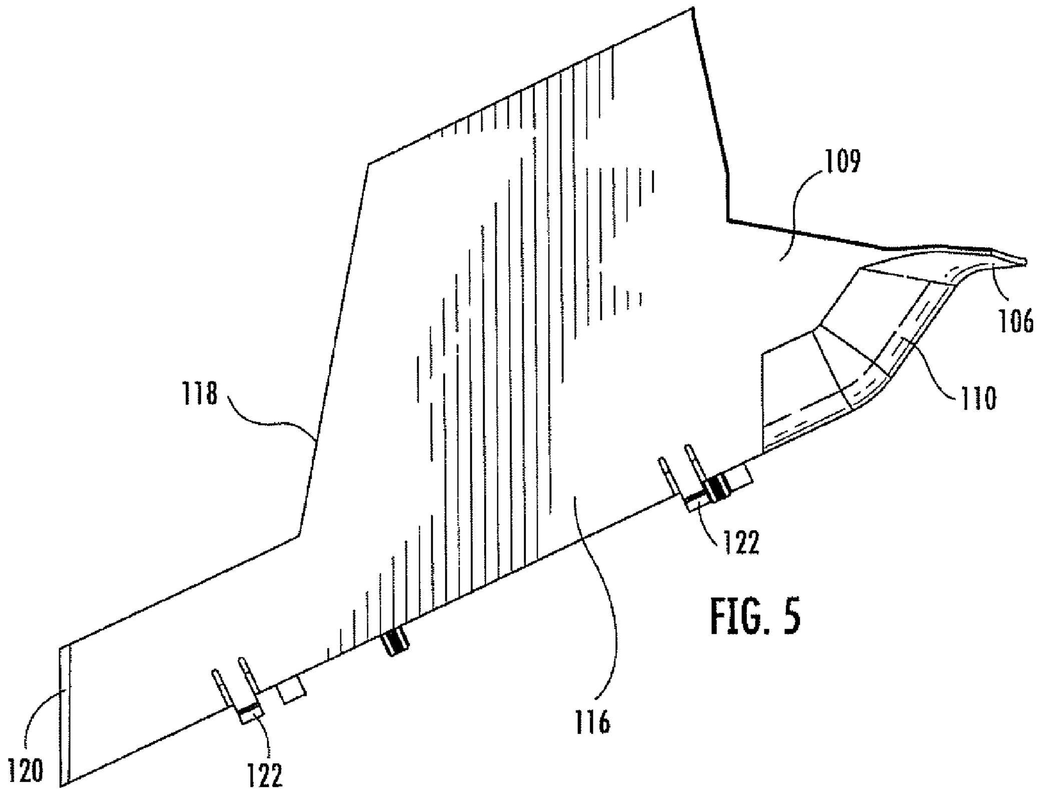
FIG. 5 is a side view of the chute unit of FIG. 4.
Figure 6:
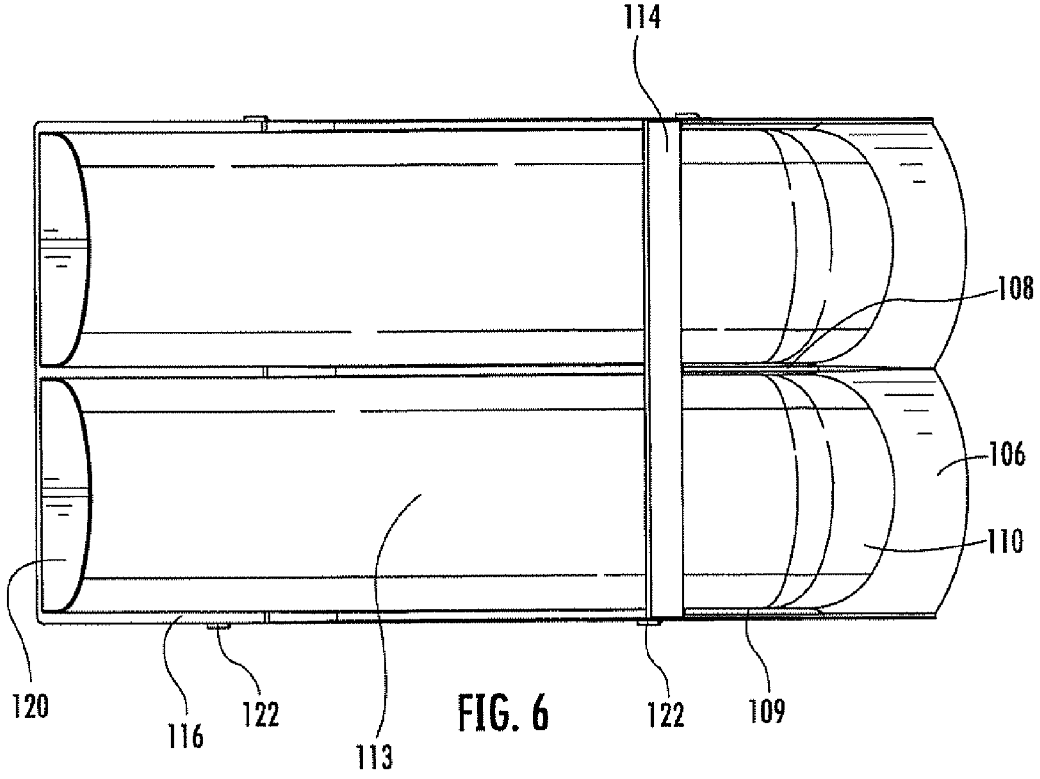
FIG. 6 is a top view of the chute unit of FIG. 4.

Referring again to FIG. 4 and also to FIGS. 5 and 6, the chute 102 has a rear lip 106 that resides above the frame 44. The lip 106 includes a shallow arc such that it is slightly concave. The lip 106 merges smoothly at its front end with a concave ramp 110. Side walls 108, 109 rise from the lateral edges of the ramp 110, with the forward ends of the side walls 108, 109 being higher than the rearward ends. The effect of the configuration provided by the lip 106, the ramp 110 and the side walls 108, 109 is that of a half-bowl that drains downwardly into the remainder of the chute 102. The lower portion of the ramp 110 rests on the frame 44.

Figure 7:
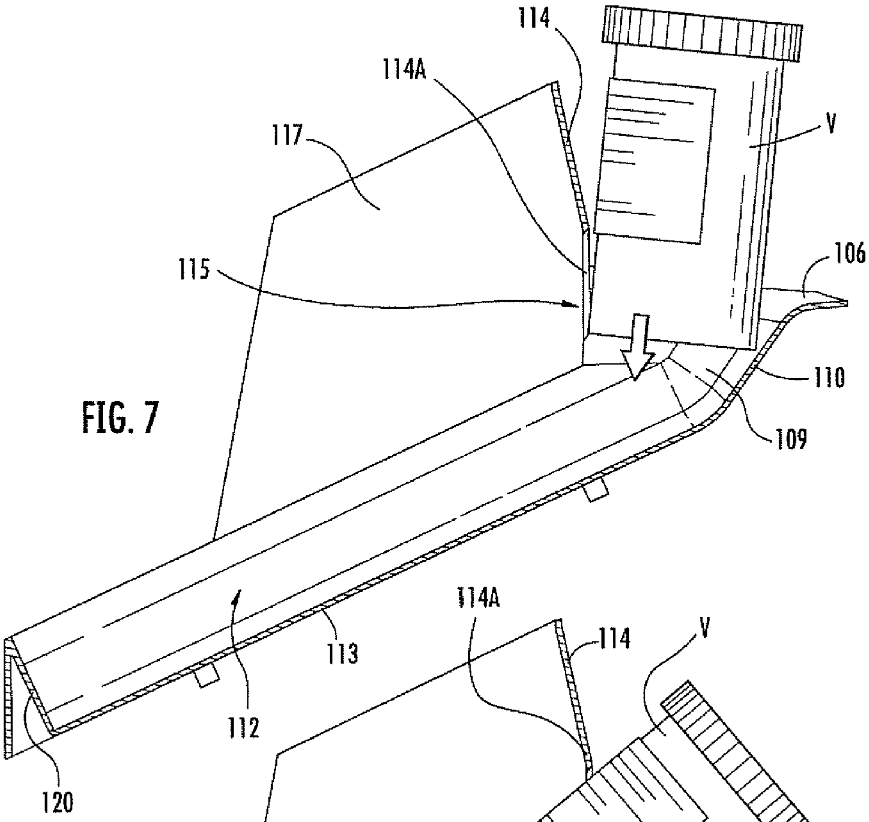
FIGS. 7-10 are sequence views of a vial traveling through the chute unit of FIG. 4, the chute unit being shown in side section view.
Figure 8:
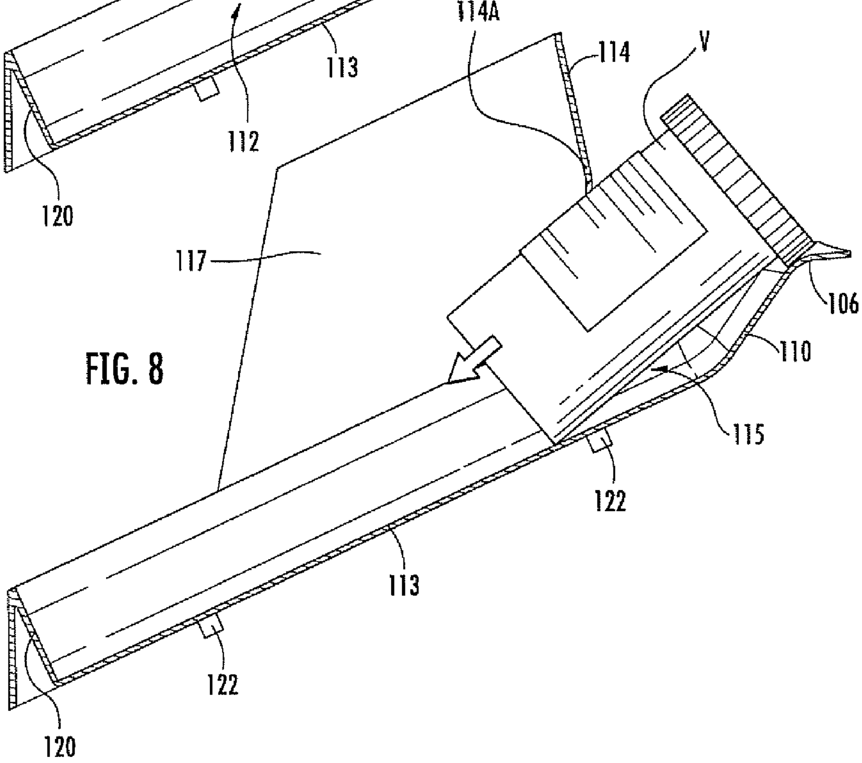
Figure 9:
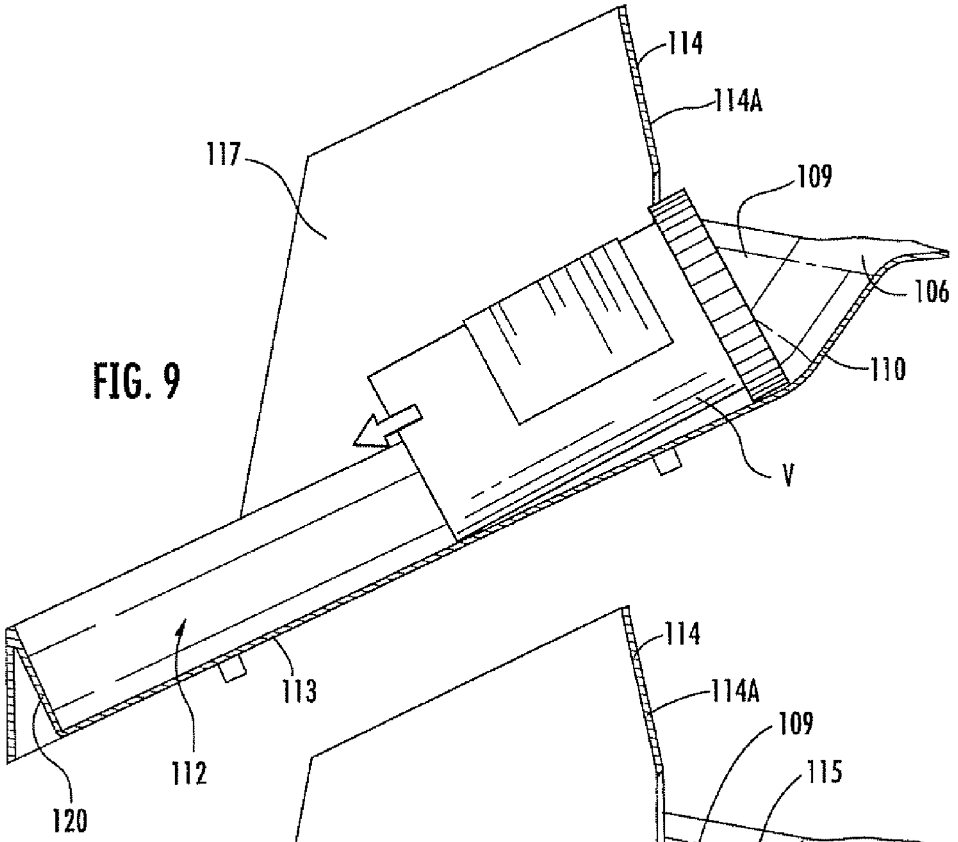
Figure 10:
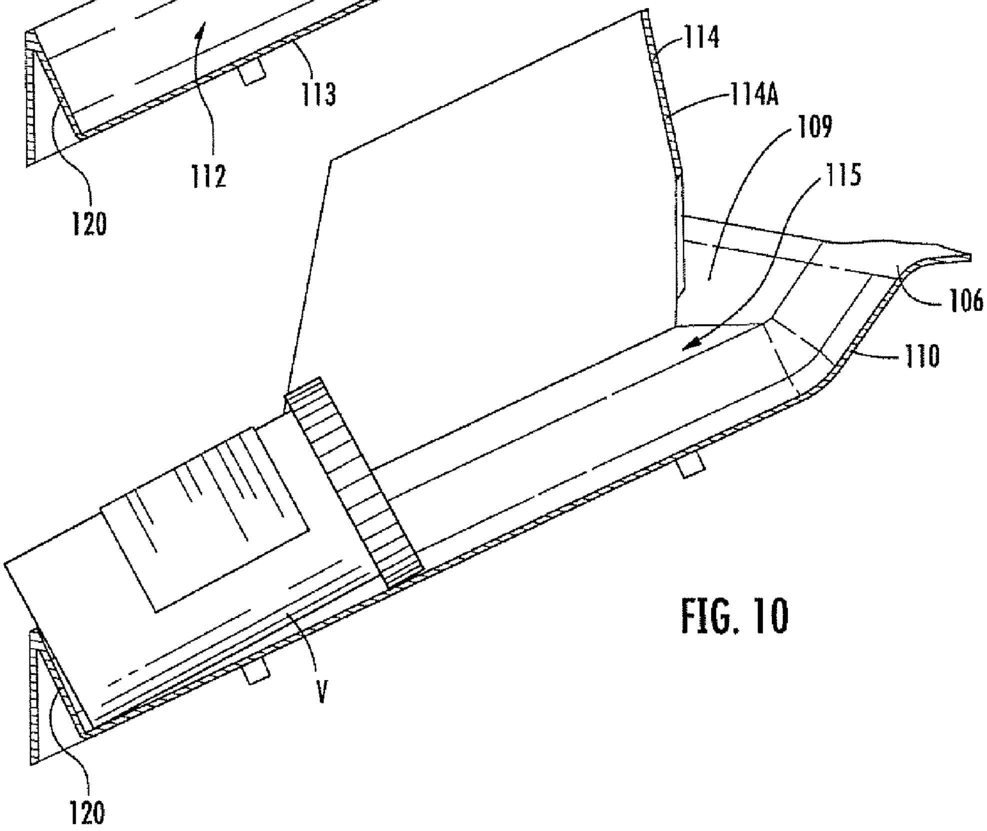

Still referring to FIGS. 4-6, a trough 112 having an arcuate profile extends forwardly and downwardly from the front end of the ramp 110. The trough 112 includes a concave floor 113 that is bounded at its lateral edges by dividers 116, 117. A rear wall 114 rises above the rear end of the trough 112; the bottom portion 114*a* of the rear wall 114 angles rearwardly and has an arcuate lower edge 114*b* that, in combination with the rear end of the floor 113, forms an inlet 115 (see FIG. 7). At their rearward ends, the dividers 116, 117 are similar in height to the rear wall 114. Each of the dividers 116, 117 has a leading edge 118 that slopes sharply downward in a central portion of the divider 116, 117, such that the forward portion of the divider 116, 117 is relatively low. A front wall 120 spans the front ends of the troughs 112 and provides a landing area for vials. The front wall 120 may have a foam or other shock absorbent material attached thereto to reduce any rebound effect of the vial dropping down the chute 102 and striking the front wall 120.

The chute unit 100 is attached to the frame 44 via four latches 122. The latches 122 are inserted into mating apertures (not shown) in the frame 44. In the illustrated embodiment, the chute unit 100 is mounted so that the troughs 112 slope downwardly from back to front; for example, the chute unit 100 may be mounted such that the trough 112 is angled relative to a horizontal plane at an angle of between about 20 and 35 degrees.

In the illustrated embodiment, the chute unit 100 is formed as a unitary member, although those skilled in this art will appreciate that the chute unit may be formed with multiple components. The chute unit 100 may be formed of any material recognized as being suitable for the conveying of objects such as pharmaceutical vials; exemplary materials include polymeric materials such as polycarbonate, ABS and copolymers and blends thereof.

Referring now to FIGS. 7-10, in operation, after a vial V has been dispensed, labeled, filled and capped, it is transported by the carrier to the offload station 66. The carrier 70 deposits the vial V "right-side up" into the half-bowl formed by the lip 106, the side walls 108, 109, and the ramp 110 (see FIG. 7); the angled bottom portion 114*a* of the rear wall 114 can also assist in funneling the vial V into position. In some embodiments, the dimensions of the lip 106, ramp 110, side walls 108, 109 and bottom portion 114*a* of the rear wall 114 are selected to ensure that a "right side up" vial V presented by the carrier 70 exits the "half-bowl" with the lower (i.e., non-capped) end leading the upper, capped end, irrespective of which of multiple common vial sizes is presented (see FIG. 8). Typically, the length of a capped vial V is between about 2 and 4 inches, and the diameter is between about 1.25 and 2.0 inches. In some embodiments, the distance between the side walls 108, 109 is between about 2.5 and 2.75 inches, the ramp 110 has a depth of about 1.5 to 2.0 inches, the distance from the rear edge of the ramp 110 to the rear edge of the bottom portion 114*a* of the rear wall 114 is between about 3.25 and 3.5 inches, and the ramp 110 generally forms an angle of between about 20 and 30 degrees relative to an underlying horizontal surface.

Figure 13:
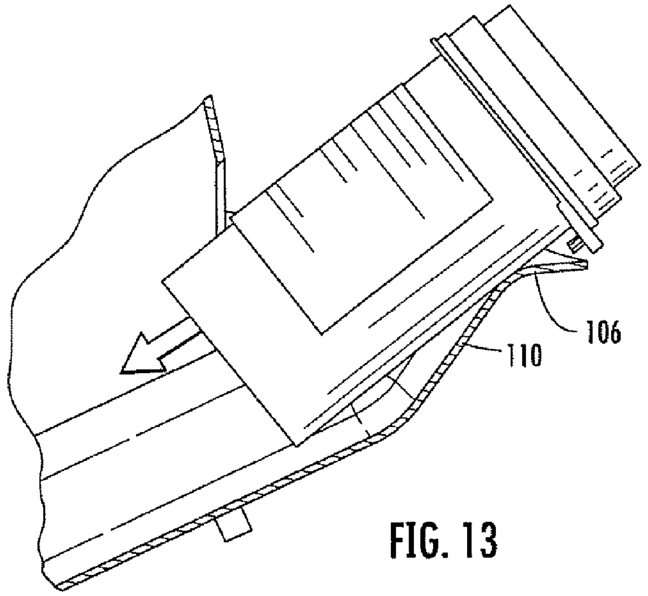
FIG. 13 is an enlarged side section view illustrating a reversible closure (RC) vial entering the chute unit of FIG. 4.

Also, the smoothly merging side walls 108, 109, lip 106 and ramp 110 are configured such that vials do not snag or hang thereon. In particular, vials known as "RC" vials (available from Owens-Corning, Owens, Ill.), have a finger on the edge thereof that might be susceptible to being caught on an unsmooth surface (see FIG. 13).

Figure 11:
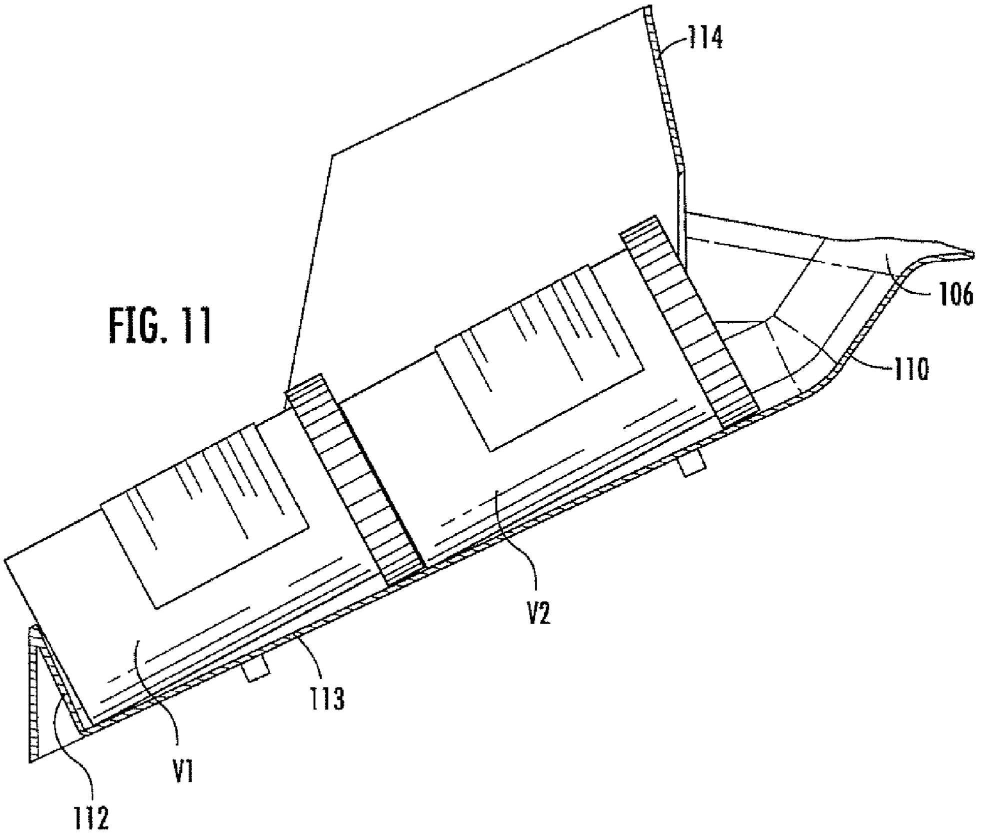
FIG. 11 is a side section view of the chute unit of FIG. 4 illustrating that the trough thereof can hold two vials at once.
Figure 12:
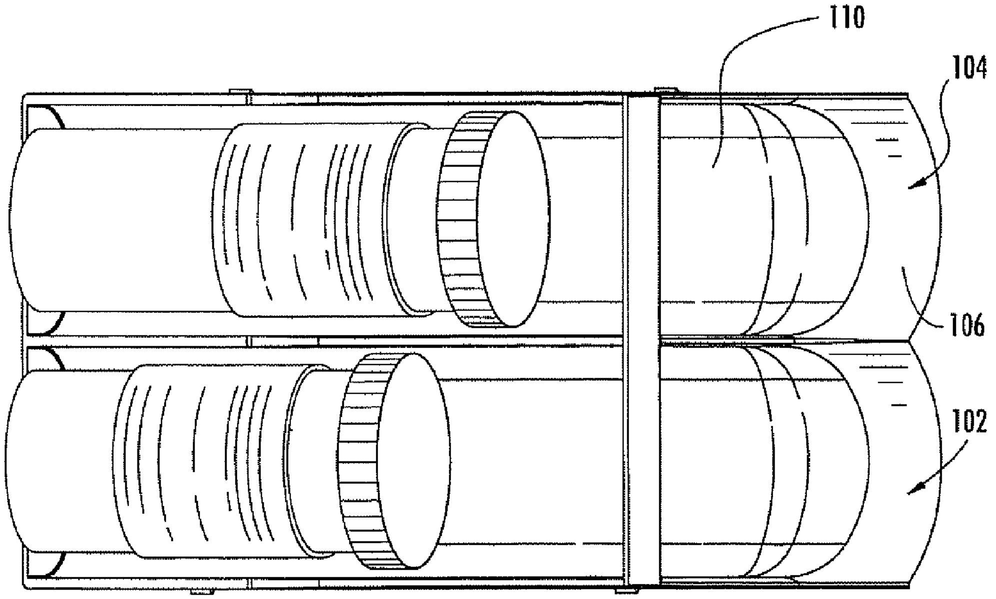
FIG. 12 is a top view of the chute unit of FIG. 4 illustrating that the chutes can hold vials of different sizes.

Once the vial V enters the half-bowl formed by the ramp 110, the side walls 108, 109 and the lip 106, the vial V, oriented "non-capped end down", slides through the inlet 115 (see FIG. 9) and down the trough 112 to the front wall 116 (see FIG. 10), where it rests until pharmacy personnel remove it. In some embodiments, it may be desirable for at least two vials V1, V2 to be stored at once in the trough in a stacked arrangement (see FIG. 11). As such, the trough 112 may have a length of between about 9 and 10 inches, which enables two vials 4 inches in length to be stored and accessible for pharmacy personnel. Also, vials of different sizes can be stored in chutes 102, 104 (see FIG. 12).

Also, the dividers 116, 117 may be configured such that the chute unit 100 satisfies the provisions of UL 61010A-1, 1740 (the requirements of which are hereby incorporated herein by reference), which requires that an object 2.95 in diameter be prevented from entering the inlet 115 (this test is intended to simulate a human hand entering the inlet 115 from outside of the system). In some embodiments, the leading edges 118 of the dividers 116, 117 are positioned between about 5 and 7 inches from the inlet 115 and are between about 2.5 and 2.75 inches apart.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An offloading unit for an automated pharmaceutical machine that dispenses filled, capped pharmaceutical vials, comprising:

at least one chute, the chute including a receiving section and a pick-up section, the receiving section and the pick-up section divided by an inlet, the receiving section having a concave sloping ramp and side walls, the pick-up section having a trough with a floor that slopes relative to a horizontal surface and a front wall at one end of the trough, the inlet being defined by a rear wall and the upper edge of the trough;

the chute also including dividers mounted to and rising above the trough and attached to the rear wall, the dividers having front edges;

the inlet having a largest dimension of no more than 2.85 inches, and the front edges of the dividers being between about 5 and 7 inches from the inlet.

2. The offloading unit defined in claim 1, wherein the trough has a width of between about 2.5 and 2.75 inches.

3. The offloading unit defined in claim 1, wherein the trough has a concave floor.

4. The offloading unit defined in claim 1, wherein the dividers are separated by a distance of between about 2.5 and 2.75 inches.

5. The offloading unit defined in claim 1, wherein the dividers include sloping front edges.

6. An offloading unit for an automated pharmacy machine that dispenses filled, capped pharmaceutical vials, comprising:

at least one chute, the chute including a receiving section and a pick-up section, the receiving section and the pick-up section divided by an inlet, the receiving section having a concave sloping ramp and side walls, the pick-up section having a trough with a floor that slopes relative to a horizontal surface and a front wall at one end of the trough, the inlet being defined by a rear wall and the upper edge of the trough;

wherein a distance between the front wall and the upper edge of the trough is between about 9 and 10 inches.

7. The offloading unit defined in claim 6, wherein the trough has a width of between about 2.5 and 2.75 inches.

8. The offloading unit defined in claim 6, wherein the trough has a concave floor.

9. The offloading unit defined in claim 6, wherein the pick-up section has dividers on opposite sides of the trough, and wherein the dividers are separated by a distance of between about 2.5 and 2.75 inches.

10. The offloading unit defined in claim 9, wherein the dividers include sloping front edges.

11. An offloading unit for an automated pharmaceutical machine that dispenses filled, capped pharmaceutical vials, comprising:

at least one chute, the chute including a receiving section and a pick-up section, the receiving section and the pick-up section divided by an inlet, the receiving section having a concave sloping ramp and side walls, the pick-up section having a trough with a floor that slopes relative to a horizontal surface and a front wall at one end of the trough, the inlet being defined by a rear wall and the upper edge of the trough;

the chute also including dividers mounted to and rising above the trough and attached to the rear wall;

the inlet and dividers being configured and positioned such that an object 2.95 inches in diameter cannot pass through the inlet from the trough.

* * * * *